July 20, 1943.  C. E. MILLER  2,325,012
END WORKING TOOL MECHANISM
Filed Jan. 29, 1940   4 Sheets-Sheet 3

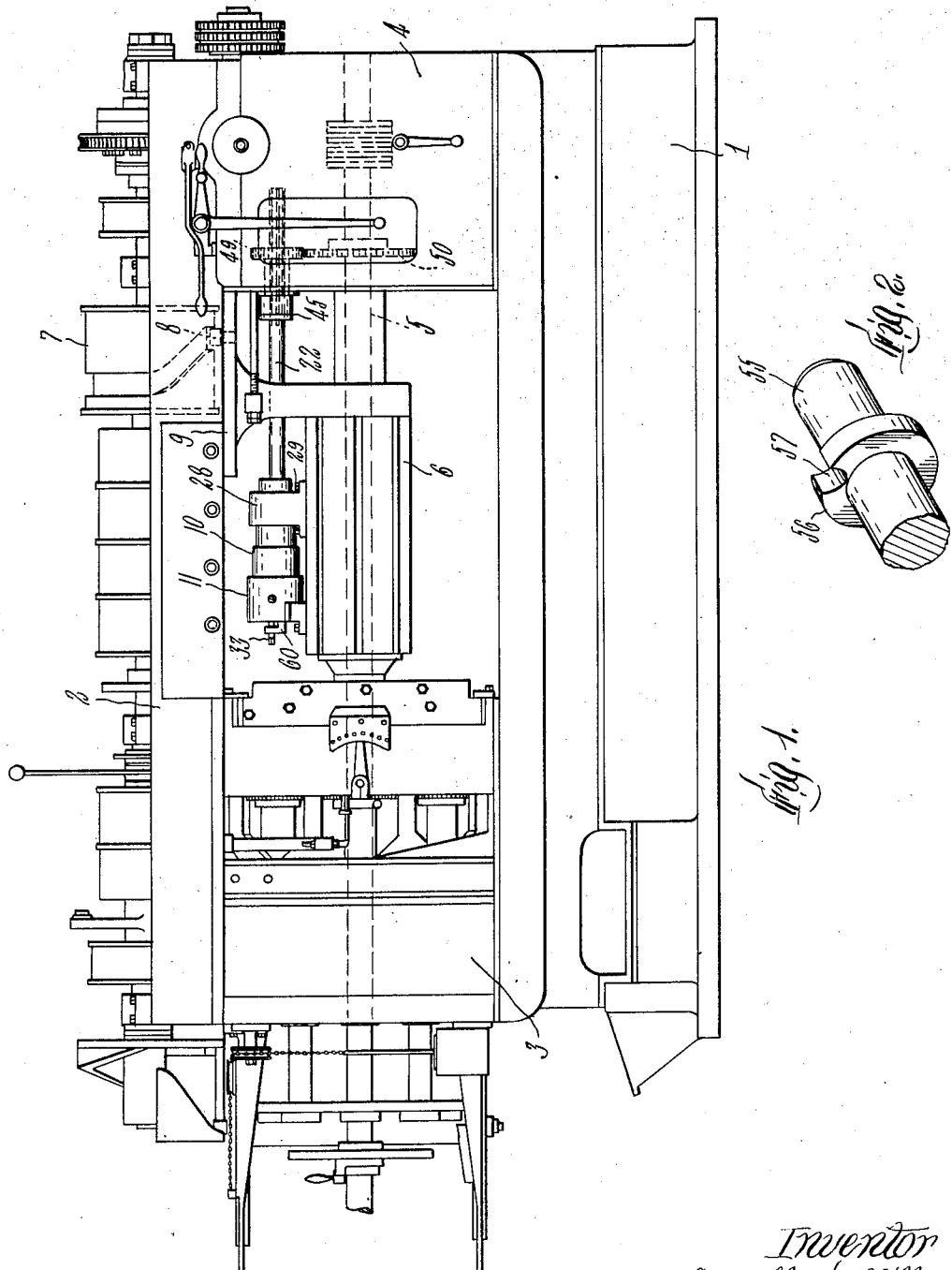

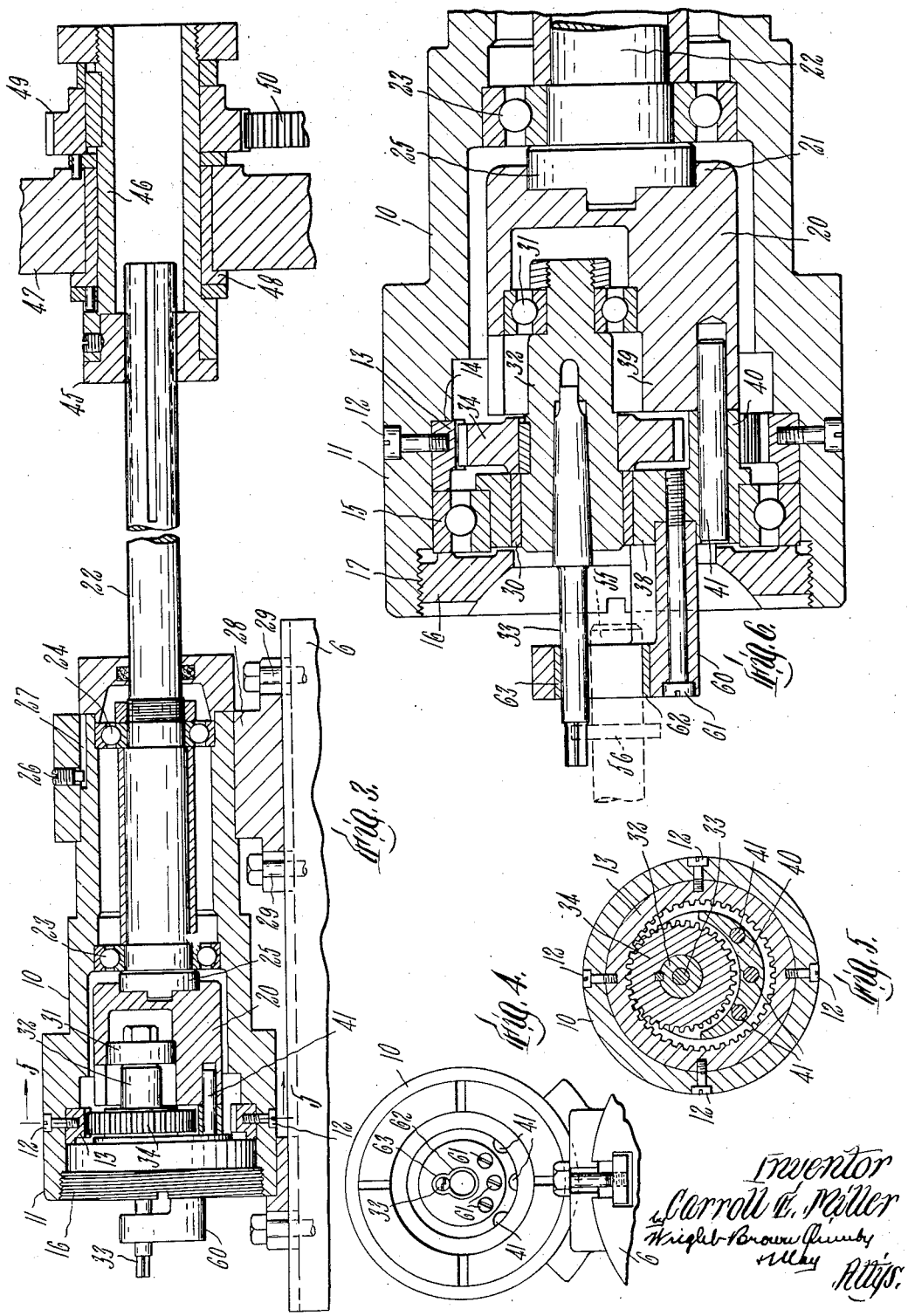

Inventor
Carroll E. Miller
by Wright Brown Quinby & May
Attys.

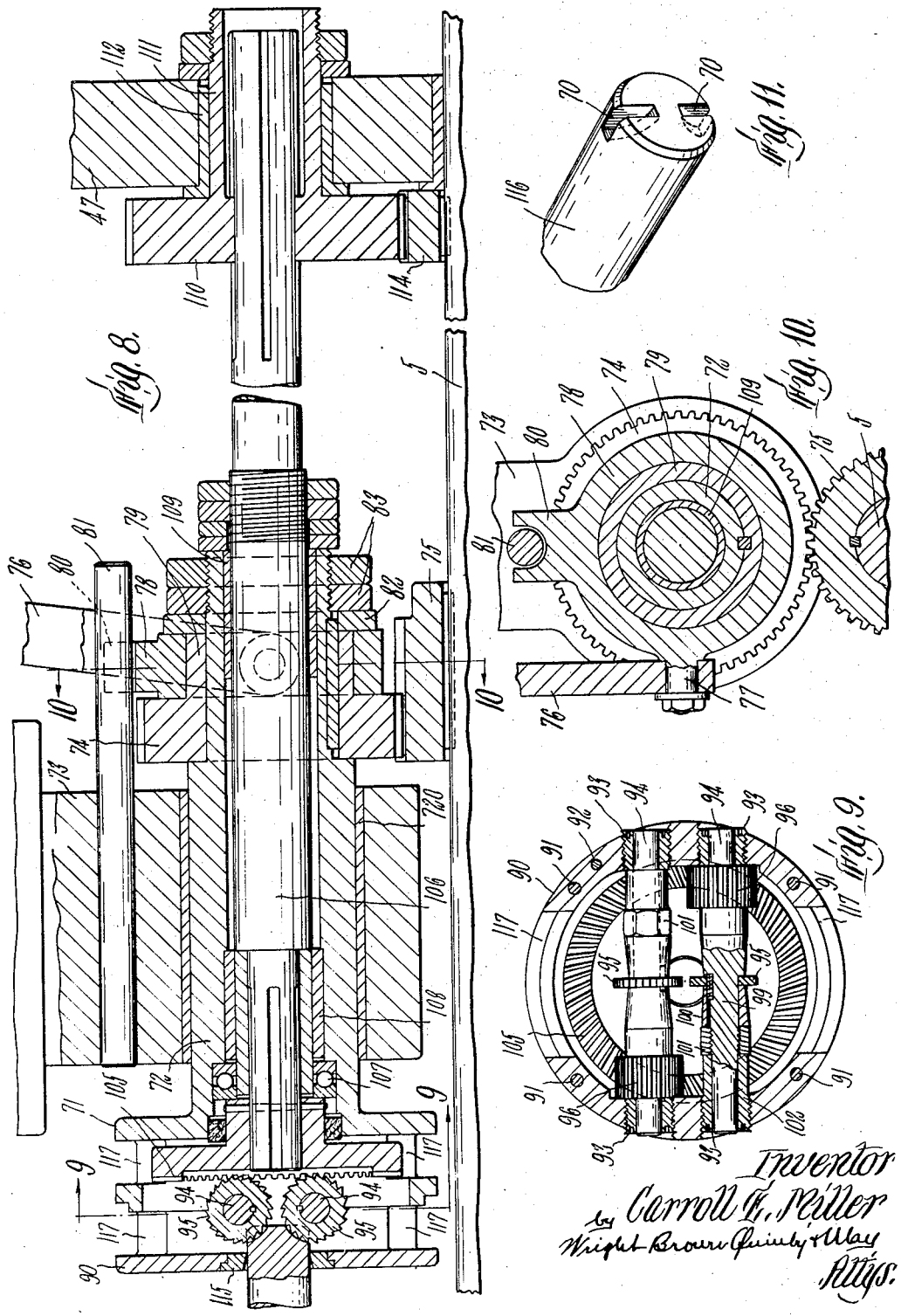

Patented July 20, 1943

2,325,012

UNITED STATES PATENT OFFICE

2,325,012

END WORKING TOOL MECHANISM

Carroll E. Miller, Windsor, Vt., assignor to Cone Automatic Machine Company Inc., Windsor, Vt., a corporation of Vermont Application January 29, 1940, Serial No. 316,099

6 Claims. (Cl. 29—57.)

This invention relates to end working tool mechanisms particularly suitable for machines such as multiple spindle lathes where the work is carried by rotating spindles, and it has for an object to provide for cutting transversely of the work axis and while the work is rotating. To this end the tool or tools are caused to rotate with the work so that they are maintained in stationary angular position with respect to the work axis, but have imparted thereto their own tooling motions in addition to their motions of rotation with the work.

For a more complete understanding of this invention, reference may be had to the accompanying drawings in which Figure 1 is a front elevation of a multiple spindle lathe, with many parts omitted for the sake of clarity, and showing a mechanism embodying the invention applied thereto.

Figure 3 is a central longitudinal section through the end tool mechanism of Figure 1, certain of the driving mechanisms being shown in side elevation.

Figure 4 is a tool end elevation of the mechanism of Figures 1 and 3.

Figure 5 is a section on line 5—5 of Figure 3.

Figure 6 is a central longitudinal section through the forward portion of the tool head.

Figure 7 is a view somewhat similar to Figure 1, but showing a different tool mechanism.

Figure 8 is a central longitudinal section through the mechanism shown in Figure 7.

Figure 2:
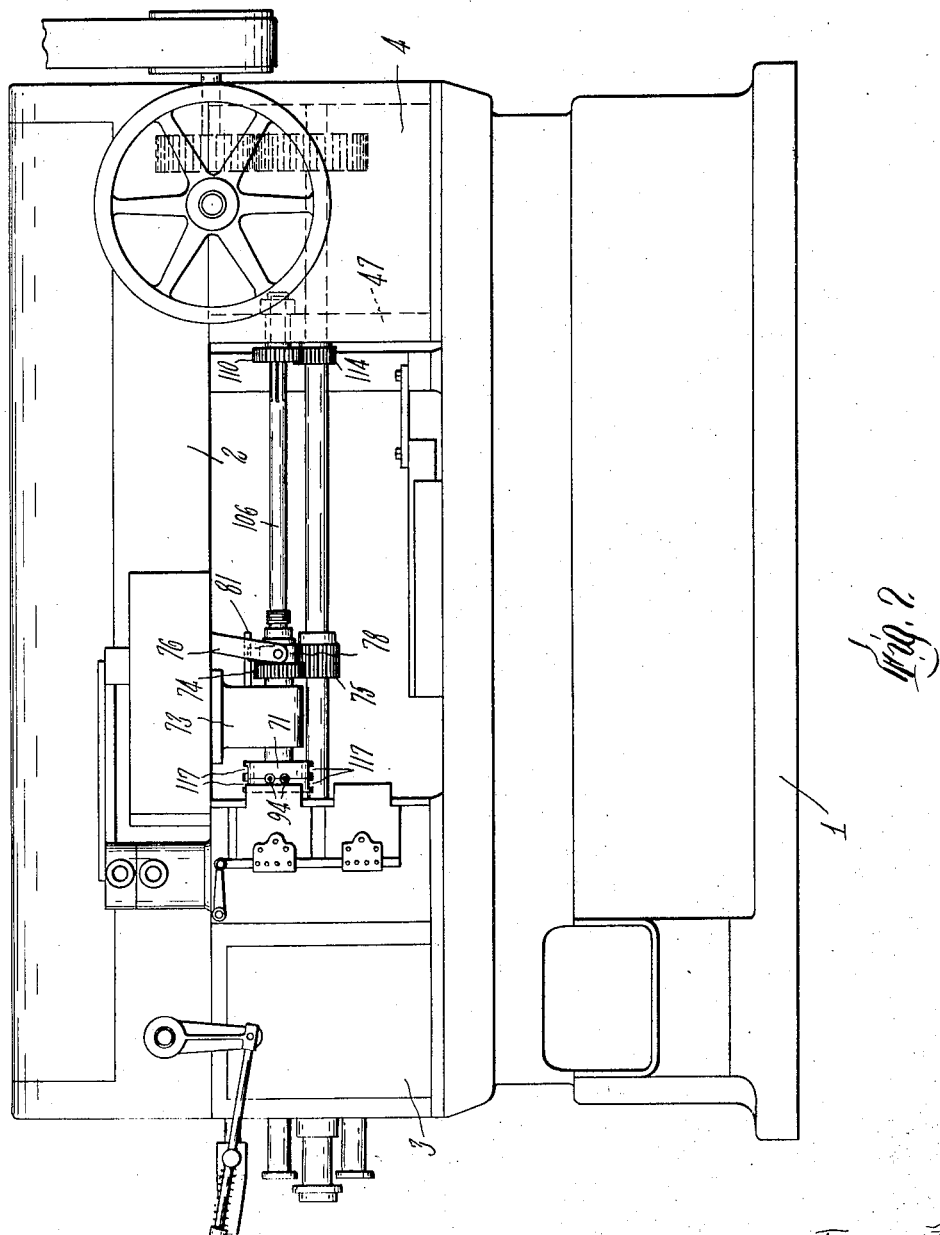
Figure 2 is a perspective view of an end portion of the work illustrating the operation performed by the end working tool mechanism of Figure 1.

Figures 9 and 10 are sectional views on lines 9—9 and 10—10, respectively, of Figure 8.

Figure 11 is a fragmentary perspective view of an end portion of the work and showing the operation performed by the mechanism of Figures 7 to 10, inclusive.

Referring first to the constructions shown in Figures 1 to 6, inclusive, one form of mechanism embodying the invention is illustrated. In Figure 1 it is shown as applied to a multiple spindle lathe of the well known Cone type, as shown, for example, in the Miller Patent No. 2,130,809 granted September 20, 1938. Such a machine, in general, comprises lower and upper beds 1 and 2, the upper bed being supported from the lower bed by suitable columns 3 and 4. In column 3 is arranged an indexing work carrier which includes a plurality of rotary work spindles arranged in circular array about a horizontal indexing axis, as more completely shown in the Miller patent to which reference has been made. Arranged in this axis is a drive shaft 5, the rotation of which is caused to rotate the various spindles. At 6 is shown a tool support mounted for axial motion along the axis of the shaft 5 and which is moved as by a cam 7 controlling a follower 8 carried by a slide 9 mounted on the support 6. This motion of the support 6 is for the purpose of bringing the end working tool up into operative relation with the work and to feed it relative to the work and retract it therefrom.

The tool mechanism, as shown best in Figures 3 and 6, comprises a casing 10 which is secured to the support 6 for axial motion therewith. This casing 10 has a forward portion 11 of larger diameter within which is secured as by screws 12 an internal gear 13. This gear 13 abuts an annular shoulder 14 of the casing 10 on one side and its opposite side is engaged by one member of a ballbearing 15 which is secured in position by a ring 16 having threaded engagement in the internal threads 17 at one end of the casing 10. This casing 10 serves to house therein a tool head 20, the forward portion of which is journaled in the bearing 15 and the rear portion 21 of which is coupled to the forward end of a shaft 22 journaled in the bearings 23 and 24 in the casing 10. The coupling at 25 insures against relative rotation between the head 20 and the shaft 22. The casing 10 is held against rotation with respect to its support 6 as by means of a threaded plug 26 engaging the keyway 27 in the casing, the plug 26 being mounted in a bracket 28 secured as by the bolts 29 to the support 6. The tool head 20 has journaled therein within a bearing bushing 30 and a ballbearing 31, a tool support 32 which is shown as supporting a rotary milling cutter 33, this cutter being eccentric to the axis of rotation of the head 20, which itself is coaxial with one of the work supports at one of the operative stations of the indexing work holder.

Between the bearing bushing 30 and the ballbearing 31 the tool carrier 32 has keyed thereon a gear 34 which meshes with the internal gear 13 so that as the tool head is rotated the gear 34 travels in an orbital path and as it has a smaller number of teeth than the internal gear 13 it is caused to rotate about its own axis so that it rotates the tool 33 about its axis.

In order that the gear 34 may project from the head 20, this head 20 is shown as made in two parts 38 and 39, the part 38 being provided with a segmental extension 40 which bears against the end face of the portion 39, the two parts 38 and 39 being held together as by the pins 41. This construction affords sufficient space for this gear 34 to project outwardly from between the parts 38 and 39 into engagement with the gear 13.

The rear end portion of the shaft 22 is shown as keyed within a bushing 45 in a sleeve 46 journaled for rotation in a stationary frame member 47 within a bearing bushing 48. This sleeve 46 has keyed thereto a gear 49 which is in mesh with a gear 50 fixed to the shaft 5, this gear ratio being such that the sleeve 46 and the shaft 22 is driven at the same rate of speed as the work holder. Thus the orbital motion of the tool 33 is timed exactly with the rotation of the work.

One type of work which may be done with this mechanism is illustrated in Figure 2 in which the work piece 55 is provided with a flange 56, the tool 33 being operative to cut a notch 57 in the flange 56 while the work is rotating as driven by the shaft 5, the tool maintaining its angular relation to the work axis throughout the tooling operation and while the tool itself is given a rotation about its own axis which produces the cutting of the work. In order to support the extended end of the work and the tool in proper relation, a supporting bracket 60 is shown as secured to the outer tool head member 38 as by means of screws 61, this support being provided with a hardened bushing 62 to receive and support the forward end of the work piece as shown in Figure 6, this bushing having a lateral extension 63 (see Figure 4) for supporting the shank portion of the tool 33.

With this mechanism the notch 57 is cut in the flange 56 without interrupting the rotation of the work, the cutting tool 33 being given its feed and retracting stroke by the cam 7 and the tool being rotated about its own axis by the relative rotation between the tool shaft 22 and the casing 10, which casing in the embodiment illustrated is held against rotation.

In Figures 7 to 11 a different tooling mechanism is shown which is intended to cut slots 70 in the end of a work piece 116 as shown in Figure 11, the work piece continuing to be rotated while the cuts are being made. With this mechanism the cutting tools are disposed in a different manner from that shown in Figure 1, there being no tool slide 6 as is shown in Figure 1.

The tool head 71 shown in these figures is provided with a sleeve portion 72 journaled in a bushing 720 in a bracket 73 which is secured to the under side of the upper bed 2. This tool head is capable of both rotating and axial motion. It is rotated at the same speed as the work holder, being provided for this purpose with a gear 74 keyed thereto which meshes with a long gear 75 fixed to the shaft 5 by which the work holders are also driven. It is given its axial motion through a lever 76 which may be swung by suitable cams (not shown) on the usual cam shaft carried by the upper bed 2. This lever 76 is shown as engaging over a pivot 77 (see Figure 10) projecting from one side of a collar 78 within which the hub 79 of the gear 74 is journaled. In order to prevent rotation of this collar 78 with the tool head 72 it is shown as provided with a forked extension 80 engaging on opposite sides of a bar 81 carried by the bracket 73 and in order to secure the gear 74 and the collar 78 in position, a washer 82 is held against the end of the hub 79 by the nuts 83 threaded on the extremity of the sleeve 72. The head 71 is provided with a cover member 90 secured thereto as by bolts 91 and a locating pin 92, the cover 90 and the main portion of the head 71 being provided with bearings 93 for a pair of parallel shafts 94. Each one of these shafts has a rotary cutter 95 secured thereon, these cutters being arranged in opposed relation in position to cut the slots 70 in the work as shown in Figure 11. Each shaft 94 has a pinion 96 thereon, these pinions being arranged at opposite sides of their respective cutters.

For the purpose of securing the cutters in position, each shaft 94 may have a reduced diameter portion 99 to which the cutter is keyed at its inner end, a sleeve 100, an internally threaded nut 101 engaging the reduced diameter portion and being in turn engaged by a bearing sleeve 102 threaded into the two parts of the head 71. Each of the pinions 96 engages the spiral teeth of a face gear 105 pinned to the forward end of a rotary shaft 106 journaled in a ballbearing 107 and in bushings 108, 109 in the sleeve portion 72.

As the head 71 rotates at the same speed as the work, it carries the cutters 95 around with it so that they maintain their angular relation to the work piece and these cutters are also given rotation about their own axis by rotation of the shaft 106 relative to the tool head. This relative rotation is produced from the rotation of the shaft 5. For this purpose the rear end of the shaft 106 is keyed to a gear 110 which has a hub 111 journaled in a bushing 112 in the fixed frame member 47, and this gear 110 meshes with a gear 114 keyed to the shaft 5. The gear ratio of the gears 110 and 114, however, is different from that of the gears 74 and 75 so that the shaft 106 is rotated at a speed different from that of the tool head and the work. As shown the shaft 106 is driven at a slower rate of speed than the work and the tool head, this differential speed rotating the face gear 105 with respect to the tool head and thereby driving the cutters 95.

The cap 90 is provided with a hardened work support ring 115 which receives the outer end of the work piece 116 and supports it properly related to the cutters during the cutting operation, while the tool head is presented to and retracted from the work by axial motion through the swinging of the lever 76 as previously described. Both portions of the tool head are provided with large apertures 117 for the escape of chips from within the head.

From the foregoing description of certain embodiments of this invention, it should be evident to those skilled in the art that various changes and modifications might be made without departing from the spirit or scope of this invention as defined by the appended claims.

I claim:

1. A tool attachment comprising a casing, a tool head journaled in said casing, a tool carrier journaled in said head eccentric to the axis of rotation of said head, a gear secured to said tool carrier and projecting therefrom at one side, an internal gear concentric with said head secured to said casing and in mesh with said gear, a tool concentric with said tool carrier and rotated thereby, means for rotating said head, and a tool support projecting from one face of said head, said support having a tool guide portion and a guide for rotary work to be operated upon by said tool.

2. The combination with a rotary work holder, of a tool head journaled for rotation coaxially with said work holder, a drive shaft arranged parallel to the axis of rotation of said work holder and tool head, a tool shaft journaled in said head, driving connections from said drive shaft to said work holder and head driving said work holder and head at equal speeds, driving connections from said drive shaft to said tool shaft for driving said tool shaft at a speed different from that of said work holder and tool head, a rotary tool journaled in said tool head, means responsive to the differential speed between said tool shaft and tool head for rotating said tool, and means for moving said tool to and from work carried by said work holder.

3. The combination with a rotary work holder, of a tool head journaled for rotation coaxially with said work holder, a drive shaft arranged parallel to the axis of rotation of said work holder and tool head, a tool shaft journaled in said head parallel to said drive shaft, driving connections from said drive shaft to said work holder and head driving said work holder and head at equal speeds, driving connections from said drive shaft to said tool shaft for driving said tool shaft at a speed different from that of said work holder and tool head, a rotary tool journaled in said tool head, means responsive to the differential speed between said tool shaft and tool head for rotating said tool, and means for moving said tool to and from work carried by said work holder.

4. The combination with a rotary work holder, of a tool head journaled for rotation coaxially with said work holder, a drive shaft arranged parallel to the axis of rotation of said work holder and tool head, a tool shaft journaled in said head, driving connections from said drive shaft to said work holder and head driving said work holder and head at equal speeds, driving connections from said drive shaft to said tool shaft for driving said tool shaft at a speed different from that of said work holder and tool head, a rotary tool journaled in said head transverse to said axis, a gear on said tool shaft, driving connections from said gear to said rotary tool, and means for moving said head in the direction of its rotary axis to bring said tool toward and from work carried by said work holder.

5. The combination with a rotary work holder, of a tool head journaled for rotation coaxially with said work holder, a drive shaft arranged parallel to the axis of rotation of said work holder and tool head, a tool shaft journaled in said head parallel to said drive shaft, driving connections from said drive shaft to said work holder and head driving said work holder and head at equal speeds, driving connections from said drive shaft to said tool shaft for driving said tool shaft at a speed different from that of said work holder and tool head, a pair of parallel cross shafts journaled in said head on opposite sides of the axis of rotation of said head, a rotary cutter secured to each of said cross shafts, a pinion secured to each of said cross shafts, and a gear on said tool shaft meshing with said pinion.

6. In combination, a sleeve, a shaft on which said sleeve is journaled, a work spindle in axial alinement with said shaft, a rotating means, driving connections between said rotating means and spindle and between said rotating means and sleeve driving said spindle and sleeve in the same direction and at the same speed, a pair of spaced shafts journaled laterally in said sleeve, a cutter carried intermediate to the ends of each shaft in position to operate on work carried by said spindle, means for moving said sleeve axially to bring said cutters into and out of operative position, a gear fixed to each cutter shaft, a face gear carried by said first mentioned shaft and meshing with said cutter shaft gears, and means for producing a differential speed between said first mentioned shaft and said sleeve.

CARROLL E. MILLER.